Figure 1:
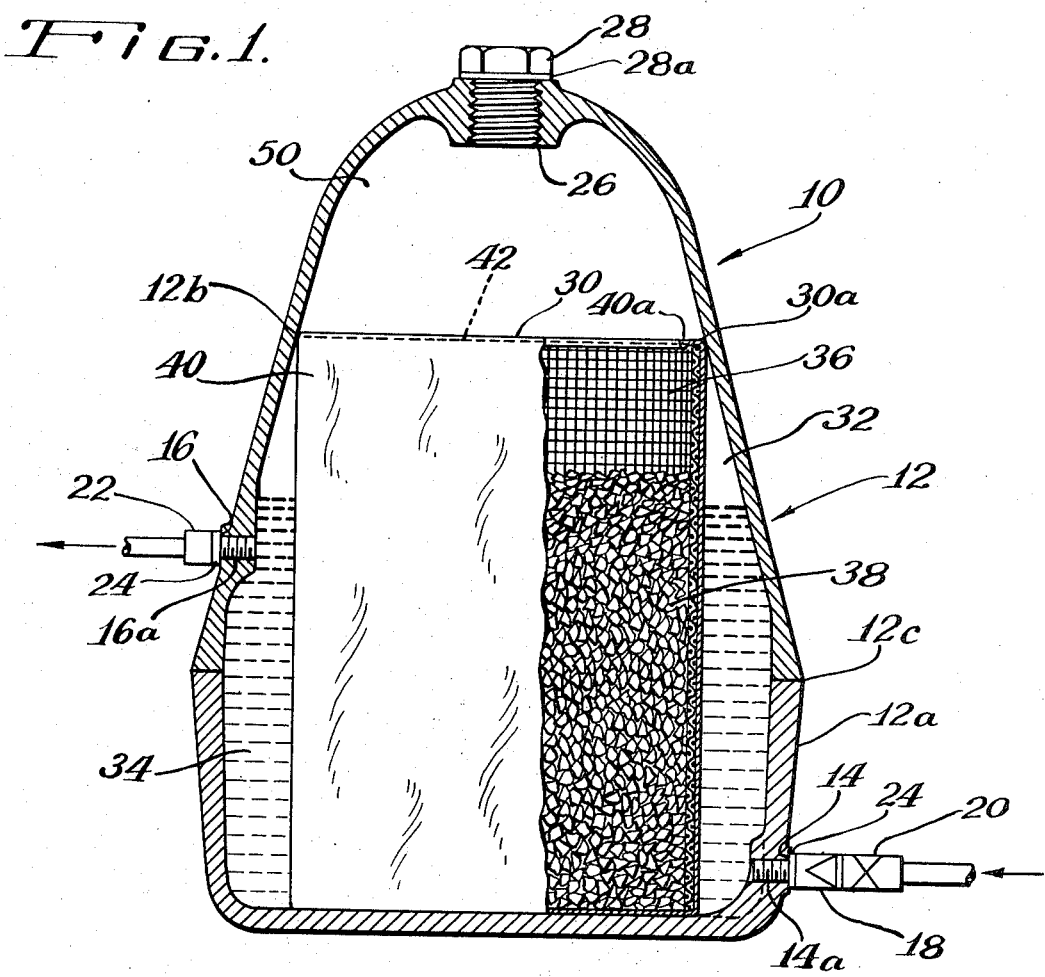

United States Patent [19]
Nelli et al.

[11] 3,772,193
[45] Nov. 13, 1973

[54] DEVICE AND METHOD FOR INTRODUCING A CHEMICAL INTO A LIQUID

[75] Inventors: Joseph R. Nelli, Gastonia; Luther C. Mitchem, Lowell, both of N.C.

[73] Assignee: First National City Bank, New York, N.Y.

[22] Filed: Nov. 8, 1971

[21] Appl. No.: 196,359

[52] U.S. Cl. .................. 210/62, 210/169, 210/205, 23/267, 137/268
[51] Int. Cl. ......................... B01d 33/38, B01j 4/02
[58] Field of Search ............... 210/60, 62, 64, 169, 210/205, 484, 501, 21, 321; 137/268; 23/267 R, 267 B, 267 D, 267 F

[56] References Cited
UNITED STATES PATENTS

| 3,677,408 | 7/1972 | Dihizo | 210/169 |
| 3,401,116 | 9/1968 | Stanwood | 210/62 |
| 3,436,345 | 4/1969 | Goodenough et al. | 210/62 |
| 3,595,395 | 7/1971 | Lorenzen | 210/169 |
| 3,468,796 | 9/1969 | Noll et al. | 210/60 X |
| 3,129,172 | 4/1964 | Dickey et al. | 210/169 |

Primary Examiner—Charles N. Hart
Assistant Examiner—Thomas G. Wyse
Attorney—Sidney Wallenstein et al.

[57] ABSTRACT

A device for introducing a chemical into a liquid to provide a preselected concentration of the chemical in the liquid. The device utilizes a limitedly permeable barrier to separate the liquid and the chemical to be introduced into the liquid. By proper regulation of the flow of a liquid through the device, a preselected concentration of the chemical can be continuously maintained in the liquid.

10 Claims, 2 Drawing Figures

PATENTED NOV 13 1973 3,772,193

Inventors:
Joseph R. Nelli
Luther C. Mitchem
Wallenstein, Spangenberg,
By Hattis & Strampel
Attys.

DEVICE AND METHOD FOR INTRODUCING A CHEMICAL INTO A LIQUID

The present invention relates to a device and method for maintaining a desired concentration of a chemical in a liquid.

The advantages of utilizing apparatus adapted to automatically dispense or feed a chemical into a liquid to provide a predetermined concentration of the chemical in the liquid are well recognized. One area of use, in particular, where the advantages of such apparatus have gained this recognition is in the treatment of swimming pool water with sanitizing chemicals. As a result, various types of chemical feeders or dispensers have been developed especially for use in maintaining a relatively uniform concentration of a chemical, usually chlorine, in the swimming pool water. While equipment heretofore available for this purpose is capable of chlorinating swimming pool water, such equipment has a number of shortcomings chief among which are its high initial cost, complicated installation and operation, variable performance, cumbersomeness, inability to readily supply greater quantities of chemical to meet rapid changes in demand, the need to utilize a sanitizing chemical in a densified form, such as compressed tablets, pellets or briquettes, to attain controlled release of the chemical, and the use of numerous moving parts with the consequent need for frequent maintenance, repair and replacement.

In accordance with the present invention, a device is provided which substantially overcomes the aforementioned shortcomings of prior art chemical feeders or dispensers. The device of this invention is of compact, durable, corrosion-resistant construction. Apart from a conventional control valve associated with the device, it has no moving parts thereby reducing to a minimum maintenance, repair and replacement costs. In addition, the device can be installed with ease to operate in conjunction with existing auxiliary pool water treatment equipment such as circulation pumps, filters and heaters. the rate at which the chemical sanitizing agent is fed into the pool water by the device can be simply and readily regulated to accommodate changes in demand for available chlorine in the pool water. The chemical utilized in the device does not require modification such as densification to provide controlled release of the chemical. In fact, the chemical may be used in the form of a liquid. The device is capable of providing substantially uniform quantities of chemical continuously for an extended period, and no shut-down time is required to replenish the supply of chemical in the device.

Briefly, the device of this invention, in its preferred form, comprises a receptacle having an inlet for admitting at a controlled rate of flow a liquid into which a pool water sanitizing chemical is to be introduced, and an outlet for removing chemical-carrying liquid from the receptacle after the sanitizing chemical has been introduced into the liquid. Chemical retaining and metering means is positioned within the receptacle. Said means includes a perforated container for the sanitizing chemical, and a barrier member for metering the quantity of chemical introduced into the liquid. The barrier member is characterized in that it is limitedly permeable with respect to liquid entering the receptacle to enable a portion at least thereof to permeate therethrough in one direction into contact with the sanitizing chemical in the perforated container, and, further, is limitedly permeable with respect to liquid into which the sanitizing chemical has been introduced to enable a portion at least of the sanitizing chemical-carrying liquid to permeate therethrough in the opposite direction into the liquid flowing through the receptacle. Flow control means is provided at the inlet of the receptacle of the device to regulate the flow of liquid whereby a desired concentration of the sanitizing chemical can be maintained in the pool water. Back flow means is positioned upstream of the flow control means to prevent reverse flow of chemical-carrying liquid from the receptacle.

Figure 2:
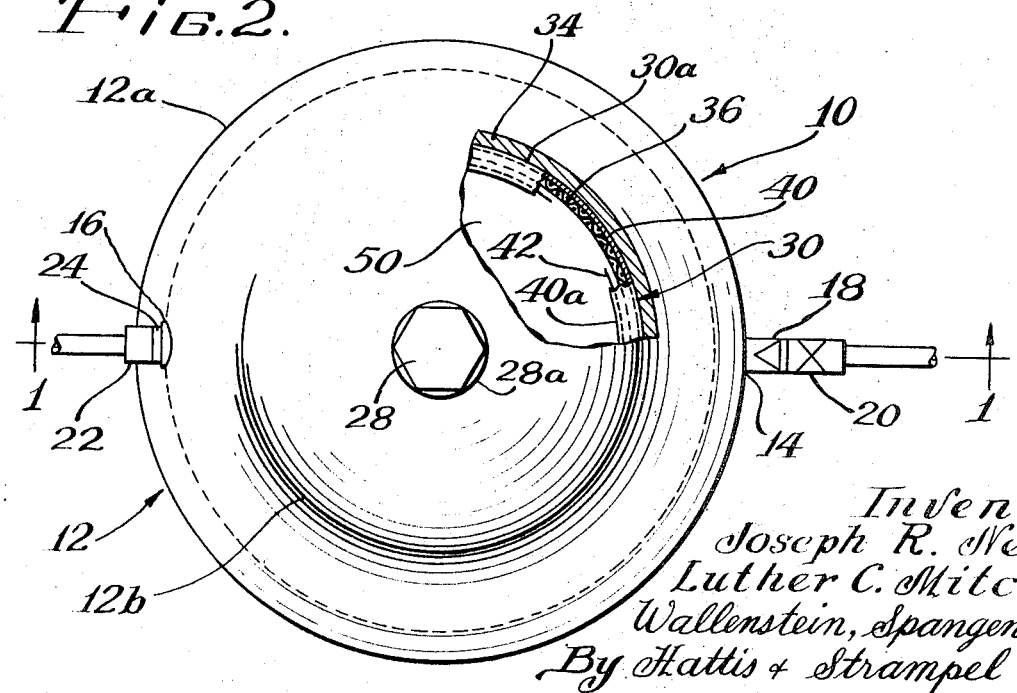

The above, and other features and advantages of the present invention will become apparent from the description to follow, taken in conjunction with the accompanying drawing wherein:

FIG. 1 is a vertical sectional view of an embodiment of the invention taken substantially along line 1—1 of FIG. 2; and FIG. 2 is a top plan view of said embodiment partly broken away and partly in section to illustrate the relationship of the various components of the device.

In the embodiment of the invention illustrated, the device 10 comprises a receptacle 12 advantageously having a lower or base portion 12a and a generally conically shaped upper portion 12b. The portions 12a and 12b desirably are formed of a chemical and corrosion-resistant, moldable material, exemplified by a plastics material such as polyethylene or polypropylene, and are joined, as by bonding, at 12c to provide a leak-proof seal therebetween.

The receptacle 12 has an inlet 14 and outlet 16. As shown, the inlet 14 is formed in the side wall of the lower or base portion 12a near the bottom thereof, while the outlet 16 is formed in the side wall of the upper portion 12b, above the point 12c at which the portions 12a and 12b are joined. The inlet 14 is tapped to receive an externally threaded nipple 14a to which is connected a back flow or check valve 18 schematically shown in the drawing. Connected in series with, and upstream of the valve 18, is a flow control valve such as needle valve 20. The valves 18 and 20 desirably are of the conventional type used for preventing backflow and regulating flow rates in fluid systems, respectively. The outlet 16 of the receptacle 12, like the inlet 14, is tapped to receive an externally threaded nipple 14, is tapped to receive an externally threaded nipple 16a provided with a connector or male union 22. Sealing means such as gaskets 24—24 are provided at the inlet 14 and the outlet 16 to prevent leakage.

The receptacle 12 has a threaded opening 26 formed in the top or apex of the upper portion 12b thereof which receives a threaded closure member 28. A sealing gasket 28a is provided for the closure member 28 to enable the member 28 to be secured in air-tight engagement on the portion 12b of the receptacle 12.

Positioned within the receptacle 12 is a chemical retaining and metering assembly 30. As shown, the assembly 30 is substantially cylindrical in shape, and, with the inner wall of the receptacle 12, defines an annular space 32 for the circulation of liquid 34 entering the receptacle 12 through the inlet 14. The height of the assembly 30 desirably is such that the upper edge or rim 30a thereof makes edge contact with the inner wall of the upper portion 12b of the receptacle 12. This arrangement serves effectively to maintain the assembly 30 centered with relation to the interior of the receptacle 12, and acts to prevent chemical from entering the annular space 32 when the assembly is recharged with chemical.

In the preferred embodiment of the invention illustrated, the assembly 30 comprises an inner, open-top, flexible, perforated container 36 for holding a supply of a chemical 38 to be introduced into the liquid 34. The container 36 desirably is fabricated of a chemical- and corrosion-resistant material such as polyethylene or polypropylene, and is enclosed or encased in a barrier member 40 formed of a tightly woven, chemical- and corrosion-resistant, flexible fabric or cloth. As best shown in FIG. 2, the member 40 is open at the top to enable the chemical 38 to be poured into the container 36. The upper edge 40a of the member 40 overlies the upper edge of the container 36 and is seamed to receive a drawstring 42 to enable the member 40 to be securely engaged on the container 36.

The fabric or cloth of which the barrier member 40 is formed is characterized in that it is difficultly or limitedly permeable with respect to a liquid passing through it in either direction. Thus, the barrier member 40, because of its limited permeability properties, is capable of maintaining a solution of the chemical 38 on the container 36 side thereof having a concentration which is greater than the concentration of the chemical which is desired in the liquid 34 flowing in the annular space 32. As a consequence, the more concentrated solution on the container 36 side of the member 40 tends to diffuse or permeate through the member 40 in the direction of the less concentrated liquid 34 in the annular space 32.

Fabrics or cloths having utility in the practice of the present invention advantageously are manufactured from a chemical- and corrosion-resistant plastics material such as polyethylene or polypropylene, and are characterized in that they have a weight, measured in ounces per square yard, of the order of about 8 to about 16, and an air permeability or porosity, measured as the number of cubic feet of air which will pass through one square foot of the fabric or cloth per minute at a pressure drop across the fabric or cloth of 0.5 inch of water, ranging from about 1 to about 14. A particularly preferred fabric or cloth is one woven from multi-filament polypropylene yarn, having a 2/1 basket weave rating, a thread count of 104 × 34, a weight of 8 ounces per square yard, and a porosity, or air permeability, of 1 cfm/ft$^2$ at 0.5 inch of water.

In utilizing the device 10, the inlet side thereof desirably is connected to a supply steam which will provide a sufficient difference in head across the inlet 14 and the outlet 16 of the device to allow proper regulation of the flow rate of the supply water into the receptacle 12. Generally optimum results are attained with a supply stream that will furnish a minimum pressure of the order of about five feet of head to the control valve 20. It is also advantageous to install the device in a system in a manner such that it will be subjected to a minimum of pressure or vacuum. To this end, when installing the device in a swimming pool water treating system, for example, the inlet side of the device is connected to the pool water circulating pump discharge line while the outlet side is connected to the pump suction or inlet line.

Chemical 38 is introduced into the container 36 through the opening 26 in the upper portion 12b of the receptacle 12. The chemical 38, as indicated hereinabove, does not require modification, as by densification, to control the rate at which it dissolves. In those instances wherein the device is used to sanitize swimming pool water, any of various known chlorine donors can be used. Exemplary of such chemicals are lithium hypochlorite, sodium hypochlorite, calcium hypochlorite, chloroisocyanurates, and the like. Sufficient chemical is added to the container 36 to fill it, or nearly so.

After the device is charged with chemical, the threaded closure member 28 is secured in air-tight engagement on the receptacle 12, and the control valve 20 is opened to allow water to enter the receptacle 12. As best shown in FIG. 1, the water reaches a level in the receptacle above the outlet 16, leaving an air space 50. Circulation of the water through the receptacle results in a partial purging of air from the space 50 thereby establishing an area of reduced pressure in the space 50 of the order of about 5 to about 10 inches of vacuum. If desired, the receptacle may be provided with a gauge (not shown) for determining the pressure conditions in the space 50.

Due to the limitedly permeable character of the barrier member 40, water in the annular space 32 slowly enters the container 36 and dissolves a portion of the chemical 38 to form a saturated solution on the container 36 side of the member 40. This solution, being of higher concentration than the water in the annular space 32, tries to reach equilibrium with the water in the annular space 32, thereby resulting in a limited permeation, transfer or diffusion of the chemical-carrying solution in the container 36 through the member 40 and into the water in the annular space 32. The chemical-carrying water in the space 32 then passes through the outlet 16 and is transported to the main body of pool water. Regulation of the amount of chlorine being fed into the pool water is controlled by the valve 20. Thus, to increase the feed rate, the valve 20 is regulated to increase the flow of water into the receptacle. To decrease the feed rate, the valve 20 is simply regulated to decrease the flow of water into the receptacle. After the daily chlorine consumption has been ascertained, the valve 20 can be set and left in that position. Generally speaking, using lithium hypochlorite as the chlorine donor, a flow of water of about 100 milliliters per minute into the receptacle will provide a concentration of about 1,500 parts per million of available chlorine in the water as it leaves the receptacle. Under normal conditions of use, for a 30,000 gallon pool, this quantity is adequate to maintain an available chlorine concentration in the main body of pool water of the order of about one part per million. Control of the amount of available chlorine fed to the pool water, to accommodate varying demands in the pool water, is attained simply by changing the rate of water flow into the device 10. This same control enables the device of this invention to be used with small or large pools. If desired, the control valve 20 may be an electrically operated solenoid valve which may be wired into the same circuit as the circulating pump so as to provide completely automated control of water flow through the device 10. The check valve 18 prevents the accidental emptying of the liquid in the receptacle in the event of failure of any type in the pool treating system that would cause the normal flow of water to reverse itself. When the chemical in the container 36 has been depleted, it is not necessary to shut down the pool treating system while the container is being recharged with chemical.

The quantity of chemical 38 dissolved by the water is dependent, in the main, upon the solubility rate of the chemical, the surface area of the chemical exposed to the water and the temperature of the water. The device of the present invention is capable of introducing chemicals with various solubility properties into a liquid without changing the assembly 30. This can be achieved by regulation of the flow of the liquid by means of the control valve 20. For less soluble chemicals the flow is increased, and for more soluble chemicals, even to the point where there is a nearly saturated solution on the outside of the barrier member 40, the regulation is achieved by decreasing the flow of water through the device.

Further, in this same connection, while the device has been described as having particular utility in the treatment of swimming pool water, it should be understood that it can be adapted for use in other areas where the introduction of chemicals into a liquid for any of various purposes is required. Thus, for example, the device can be used to introduce corrosion inhibiting and anti-scaling chemicals into cooling and boiler water systems. In addition, it can be used to control pH in the treatment of water, and the introduction of biocides in paper mill water systems. The invention, therefore, is not to be limited to the preferred embodiment shown in the drawing and described hereinabove, but only in accordance with the scope of the appended claims.

What is claimed is:

1. A device for introducing a chemical into a liquid to provide a preselected concentration of the chemical in the liquid, comprising: a receptacle having an inlet for admitting into the receptacle a liquid into which a chemical is to be introduced and an outlet for removing liquid from the receptacle after a chemical has been introduced into the liquid, and chemical metering and retaining means within the receptacle said means including a container for holding a supply of the chemical to be introduced into the liquid, said container having a perforated side wall, said means further including barrier means the inner side of which overlies and encloses the perforated side wall at least of the container and the outer side of which is in contact with the liquid introduced into the receptacle through the inlet thereof, said barrier means comprising a tightly woven, chemical- and tear-resistant material characterized in that it has a porosity such that it is limitedly permeable with respect to liquid admitted to the receptacle through the inlet thereof to enable a portion at least of the liquid in the receptacle to permeate the material in one direction into contact with the chemical to be introduced into the liquid, the porosity of the material further being such that it is limitedly permeable with respect to liquid on the inner side thereof into which the chemical has been introduced to enable a portion at least of the chemical carrying liquid to permeate the material in the opposite direction into the liquid in the receptacle on the outer side of the material, the porosity and the concomitant limited permeability characterisitcs of the material acting to continuously maintain a concentration of the chemical in the liquid on the inner side of the material at a higher level than on the outer side of the material whereby the liquid having the greater concentration of chemical will tend to continuously permeate the material in the direction of the liquid in the receptacle on the outer side of the material.

2. A device according to claim 1 wherein the outlet of the receptacle is positioned in remote relation to the inlet and above the level at which liquid is admitted to the receptacle.

3. A device according to claim 1 wherein the barrier means and the inner wall of the receptacle define an annular space for receiving a liquid into which a chemical is to be introduced.

4. A device according to claim 1 wherein the barrier means comprises a tightly woven, chemical- and tear-resistant fabric, said fabric being characterized in that it has a weight of the order of about 8 to about 16 ounces per square yard and an air permeability of the order of about 1 to about 14 cubic feet per minute at a pressure of 0.5 inch of water.

5. A device according to claim 1 wherein the container is cylindrical and is formed of a flexible, chemical-resistant screen, the side wall and bottom of the container being enclosed by the inner side of the barrier means.

6. A device according to claim 1 wherein the sides of the receptacle are formed to maintain the chemical metering and retaining means centered with respect to the vertical axis of the receptacle.

7. A device for introducing a chemical into a liquid to provide a preselected concentration of the chemical in the liquid, comprising: a receptacle having an inlet for admitting into the receptacle a liquid into which a chemical is to be introduced and an outlet to enable liquid to be removed from the receptacle after a chemical has been introduced into the liquid, and chemical metering and retaining means within the receptacle, said means including a container for holding a supply of the chemical, said container having a perforated side wall and a bottom wall, said means further including an enclosure member the inner side of which overlies the side wall at least of the container and the outer side of which is in contact with the liquid introduced into the receptacle through the inlet thereof, said enclosure member acting as a limitedly permeable barrier between the chemical in the container and the liquid introduced into the receptacle and being formed of a tightly woven, chemical- and tear-resistant fabric, said fabric being characterized in that it has a porosity such that it is limitedly permeable with respect to liquid entering the receptacle through the inlet thereof to enable a portion at least of the liquid to permeate the fabric in one direction into contact with the chemical in the container, the porosity of the fabric further being such that it is limitedly permeable with respect to liquid on the inner side thereof into which the chemical has been introduced to enable a portion at least of the chemical carrying liquid to permeate the fabric in the opposite direction into the liquid in the receptacle on the outer side of the fabric, the porosity and the concomitant limited permeability characteristics of the fabric acting to continuously maintain a concentration of the chemical in the liquid on the inner side of the fabric at a higher level than on the outer side of the fabric whereby the liquid having the greater concentration of chemical will tend to continuously permeate the fabric in the direction of the liquid in the receptacle on the outer side of the fabric, and means for regulating the quantity of liquid entering the receptacle through the inlet thereof.

8. A device according to claim 7 wherein back-flow means are provided at the inlet of the receptacle to prevent chemical carrying liquid from passing out of the receptacle through the inlet.

9. In a method of introducing chlorine in controlled amounts into swimming pool water, the steps which comprise: providing a receptacle having chemical metering and retaining means therein within which is disposed a chlorine- containing chemical to be introduced into water, said chemical metering and retaining means comprising barrier means having an inner side in contact with the chlorine-containing chemical and an outer side in contact with water in the receptacle, said barrier means having a porosity such that it is limitedly permeable with respect to water in the receptacle to enable a portion at least of the water in the receptacle on the outer side of the barrier means to permeate therethrough in one direction into contact with said chemical to be introduced into the water, the porosity of said barrier means further being such that it is limitedly permeable with respect to water into which said chemical has been introduced on the inner side of the barrier means to enable a portion at least of said chemical carrying water to permeate the barrier means in the opposite direction into the water in the receptacle on the outside of the barrier means, the porosity and the concomitant limited permeability characterisitcs of the barrier means acting to continuously maintain a concentration of the chemical in the water on the inner side of the barrier means at a higher level than on the outer side of the barrier means whereby the water having the greater concentration of chemical will tend to continuously permeate the barrier means in the direction of the water in the receptacle on the outer side of the fabric, introducing water into the receptacle to cause a portion at least of the water to permeate the barrier means whereby the chlorine-containing chemical will be introduced into the water on the inner side of the barrier means and the concentration of the chlorine-containing chemical in the water on the inner side of the barrier means will reach a level which will tend to cause the water to permeate the barrier means in the opposite direction into the water in the receptacle on the outer side of the barrier means, and feeding said chemical carrying water at a controlled rate from the receptacle into the water in the swimming pool.

10. A method according to claim 9 wherein the barrier means comprises a tightly woven, chemical- and tear- resistant fabric, said fabric being characterized in that it has a weight of the order of about 8 to about 16 ounces per square yard and an air permeability of the order of about 1 to about 14 cubic feet per minute at a pressure of 0.5 inch of water.

\* \* \* \* \*